United States Patent
Osterweil et al.

(10) Patent No.: US 12,184,688 B2
(45) Date of Patent: Dec. 31, 2024

(54) PROFILING DOMAIN NAME SYSTEM (DNS) TRAFFIC

(71) Applicant: VERISIGN, INC., Reston, VA (US)

(72) Inventors: Eric Osterweil, Fairfax, VA (US); Michael Kaczmarek, Great Falls, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 15/349,912

(22) Filed: Nov. 11, 2016

(65) Prior Publication Data

US 2018/0139229 A1    May 17, 2018

(51) Int. Cl.
*H04L 9/40*    (2022.01)
*G06Q 30/02*    (2023.01)
(Continued)

(52) U.S. Cl.
CPC ......... *H04L 63/1458* (2013.01); *G06Q 30/02* (2013.01); *G06Q 30/0201* (2013.01);
(Continued)

(58) Field of Classification Search
CPC . H04L 63/1425; H04L 63/1408; H04L 63/20; H04L 67/22; H04L 43/08;
(Continued)

(56) References Cited

U.S. PATENT DOCUMENTS 7,774,361 B1 * 8/2010 Nachenberg ........ H04L 63/1416
   707/952
8,260,914 B1 * 9/2012 Ranjan .................. H04L 63/12
   709/224

(Continued)

FOREIGN PATENT DOCUMENTS

CN          104767690      *  7/2015
WO      WO-2015195093 A1 * 12/2015   .......... H04L 61/1511

OTHER PUBLICATIONS

Extended European Search Report for Application No. 17200218.0 dated Mar. 12, 2018.
(Continued)

*Primary Examiner* — David J Pearson
(74) *Attorney, Agent, or Firm* — McCarter & English, LLP; Michael A. Sartori

(57) ABSTRACT

In one embodiment, a profiling engine analyzes DNS transaction data that is logged by a recursive resolver to generate profiling results that are used to manage network activity. In operation, the profiling engine computes scores based on the DNS transaction data and scoring criteria. The profiling engine may compute any number of scores at any level of granularity. For example, the profiling engine may compute a score for each source IP address that is associated with the DNS transaction data. Subsequently, the profiling engine generates profiling results based on the scores and profiling criteria. Notably, DNS queries are typically the first step of longer transaction chains that result in the transfer of data to and from the network. Consequently, the profiling engine may provide more timely and comprehensive insight into network activities than conventional network management tools that analyze data at layers that are further down transaction chains.

25 Claims, 3 Drawing Sheets

(51) Int. Cl.
*G06Q 30/0201* (2023.01)
*G06Q 50/00* (2012.01)
*H04L 61/4511* (2022.01)

(52) U.S. Cl.
CPC .......... *G06Q 50/01* (2013.01); *H04L 61/4511* (2022.05); *H04L 63/1408* (2013.01); *H04L 63/1425* (2013.01)

(58) Field of Classification Search
CPC ....... H04L 43/16; H04L 47/20; H04L 43/106; H04L 67/30; H04L 67/306; H04L 61/1511; H04L 67/303; H04L 43/062; H04L 43/04; H04L 47/2441; G06Q 10/0833; G06Q 30/02; G06Q 30/0201; G06Q 30/0242; G06Q 30/0246; G06Q 30/0255; G06Q 30/0269; G06Q 30/0277; G06Q 50/01
See application file for complete search history.

(56) References Cited

U.S. PATENT DOCUMENTS

| | | | | |
|---|---|---|---|---|
| 9,635,049 | B1* | 4/2017 | Oprea | H04L 63/145 |
| 9,875,355 | B1* | 1/2018 | Williams | H04L 63/1408 |
| 2005/0188031 | A1* | 8/2005 | Zandt | H04L 51/214 |
| | | | | 709/206 |
| 2008/0022115 | A1* | 1/2008 | Mock | H04L 61/35 |
| | | | | 713/178 |
| 2008/0270544 | A1* | 10/2008 | Howe | G06Q 10/107 |
| | | | | 709/206 |
| 2011/0185436 | A1* | 7/2011 | Koulinitch | H04L 63/10 |
| | | | | 726/28 |
| 2012/0087255 | A1* | 4/2012 | Ukita | H04L 61/30 |
| | | | | 370/252 |
| 2013/0117282 | A1 | 5/2013 | Mugali, Jr. et al. | |
| 2014/0304378 | A1* | 10/2014 | Courtney | H04L 41/0803 |
| | | | | 709/220 |
| 2015/0195299 | A1* | 7/2015 | Zoldi | H04L 63/1408 |
| | | | | 726/25 |
| 2015/0304199 | A1* | 10/2015 | Leask | H04L 43/0876 |
| | | | | 709/224 |
| 2015/0309918 | A1* | 10/2015 | Raghavan | G06F 11/3688 |
| | | | | 714/38.1 |
| 2016/0028607 | A1* | 1/2016 | Weill | H04L 63/0428 |
| | | | | 709/224 |
| 2016/0080212 | A1* | 3/2016 | Ramachandran | H04L 47/781 |
| | | | | 370/338 |
| 2016/0364490 | A1* | 12/2016 | Maugans, III | G06F 40/279 |
| 2017/0279795 | A1* | 9/2017 | Redberg | H04L 63/0861 |
| 2017/0323102 | A1* | 11/2017 | Manadhata | G06F 21/57 |

OTHER PUBLICATIONS

Kirchler et al., "Tracked Without a Trace: Linking Sessions of Users by Unsupervised Learning of Patterns in Their DNS Traffic", AISec '16 Proceedings of the 2016 ACM Workshop on Artificial Intelligence and Security, Oct. 28, 2016, pp. 23-34.

Redekop, D., "How to avoid DNS-based profiling", Retrieved from https://www.dnsthingy.com/2014/06/how-to-avoid-dns-based-profiling/, Jun. 3, 2014, 2 pages.

Bortzmeyer, S., "DNS Privacy Considerations, rfc7626.txt" Internet Engineering Task Force (IETF), Aug. 2015, pp. 1-17.

* cited by examiner

PROFILING DOMAIN NAME SYSTEM (DNS) TRAFFIC

BACKGROUND OF THE INVENTION

Field of the Invention

Embodiments of the present invention relate generally to computer networks and, more specifically, to profiling domain name system (DNS) traffic.

Description of the Related Art

As is well known, a wide variety of network management tools profile network activities to facilitate tasks involved in administering and maintaining networks. Oftentimes, these network management tools collect data based on Internet activities and then analyze the data for a variety of reasons, such as determining quality of service, evaluating different aspects of the business, and analyzing and testing network security. For example, some network management tools measure the amount of Internet activity of different users within a network and implement user-specific bandwidth throttling based on the amount of Internet activity. Other network management tools measure accesses to job-hunting websites over a corporate network to identify potentially discontented employees. Yet other network management tools perform threat assessment to prevent nefarious use of a network and/or malicious attacks on a network.

One limitation of these types of network management tools is that they are designed to be primarily reactive. More specifically, the network management tools oftentimes analyze Internet activities at a layer that is relatively far down any transaction chain that results in the transfer of data to and from the network. Because there is a time delay between the initiation of a transaction chain and the Internet activities that the network management tools analyze, remediation strategies may be ineffective. For example, suppose that malware configures the devices on an infected network to launch a volume-based distributed denial-of-server (DDoS) attack that involves sending a victim's machine huge amounts of random data. Because there is a time delay between the start of the attack and the resulting Internet activities that the network management tools on the infected network collect and analyze, the network management tools may be unable to prevent the victim's machine from becoming overwhelmed by the large volume of random data.

Another limitation of conventional network management tools is that they typically focus on data in a relatively myopic fashion that can obfuscate the relationship between different network activities. For example, "low and slow" DDoS attacks involve low volumes of legitimate traffic on the application layer that, in aggregate, disable a target. Many of these types of attacks involve creating a relatively low number of connections to a victim's machine over a relatively long period of time and then leaving those sessions open for extended periods of time. Eventually, the ability of the victim's machine to process sessions is exceeded, and the victim's machine is unable to accept connections from legitimate users. Because the individual connections generated during such a low and slow attack usually appear to be legitimate and unrelated, many network management tools are unable to detect that this particular type of attack is in progress.

As the foregoing illustrates, what is needed in the art are more effective techniques for profiling network activities.

SUMMARY OF THE INVENTION

One embodiment of the present invention sets forth a method for profiling domain name service (DNS) traffic. The method includes receiving DNS transaction data that is associated with DNS logging operations performed by a DNS server; determining a score based on the DNS transaction data and at least one scoring criteria; evaluating the score based on at least one profiling criteria to generate a profiling result; and performing one or more operations involving the profiling result that relate to at least one of managing activities, persistent storage, and data analysis.

Further embodiments provide, among other things, a computer-readable medium and a system configured to implement the method set forth above.

One advantage of the disclosed techniques is that profiling DNS traffic facilitates proactive and comprehensive monitoring of the network activities of devices. In particular, because DNS transactions are indicative of follow-on transactions, the profiling results may guide development and execution of effective remediation strategies. Further, because the DNS transaction data may represent DNS transactions that occur over relatively long time periods, the profiling results may identify traffic patterns that elude conventional data profiling techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
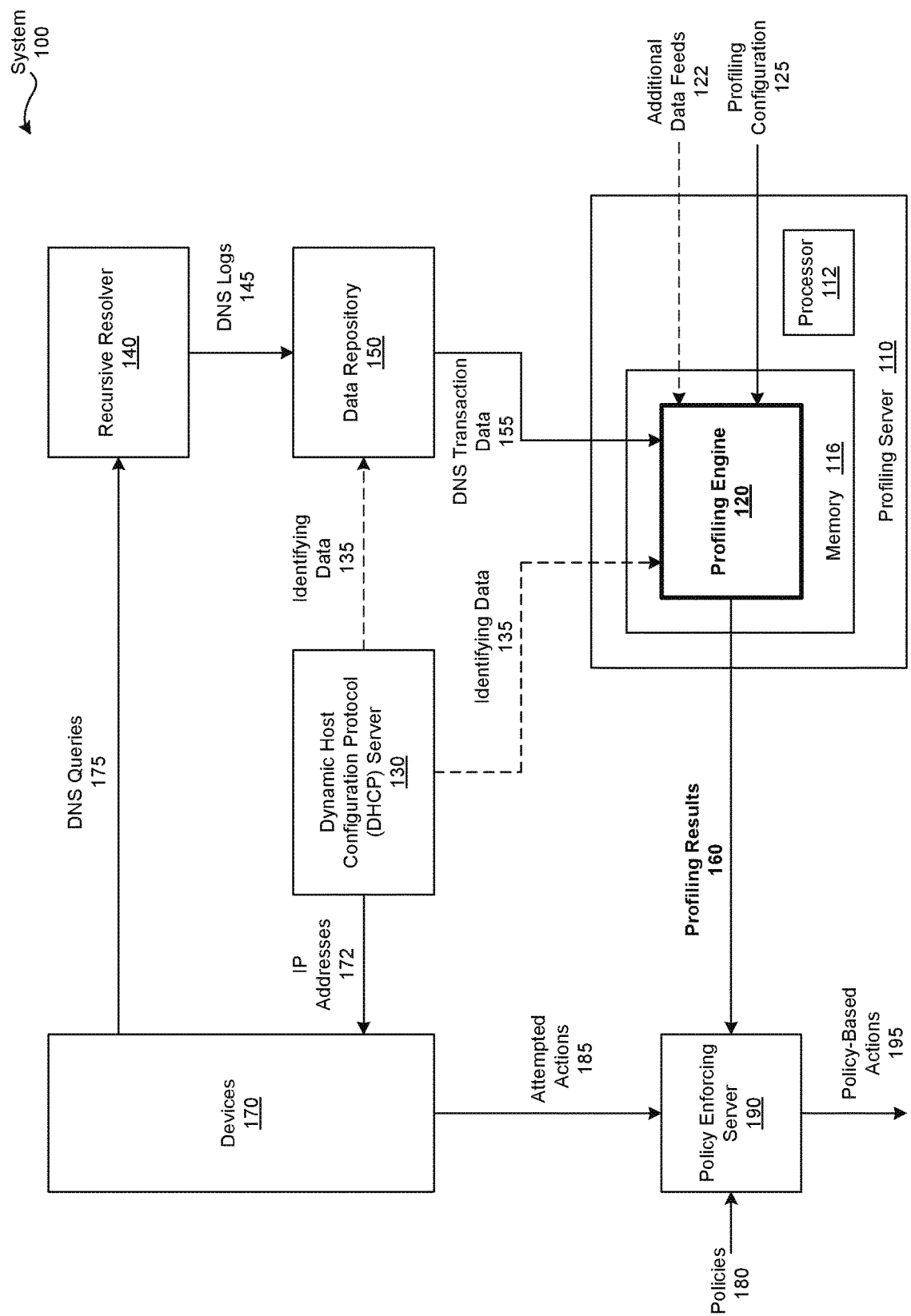
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, any number of devices 170, a policy enforcing server 190, a profiling server 110, a recursive resolver 140, a data repository 150, and a Dynamic Host Configuration Protocol (DHCP) server 130. For explanatory purposes, multiple instances of like objects are denoted with reference numbers identifying the object and parenthetical numbers identifying the instance where needed.

The devices 170, the policy enforcing server 190, the profiling server 110, the recursive resolver 140, the data repository 150, and the DHCP server 130 are connected via a network of communication paths. In general, any number of the components included in the system 100 may be connected through any number of communication paths that implement any suitable communication protocols in any technically feasible fashion. Further, different communications may use different protocols as known in the art.

Each of the devices 170 may be any electronic device that is capable of communicating with other electronic devices via the network. For example, a given device 170 could comprise a server, a laptop, a smart phone, a wearable technology device, an appliance (e.g., a washer/dryer that utilizes network communications, a smart thermostat system, etc.), a sensor (e.g., a remote monitoring heart monitoring implant, a biochip transponder, an automobile sensor, etc.), a traffic light, a parking meter, etc. Electronic devices that are not directly connected to the network are referred to herein as "external" devices.

The policy enforcing server 190 is a network management tool that facilitate tasks involved in administrating and maintaining the network. More specifically, the policy enforcing server 190 performs management operations based on any number of policies 180. In general, each of the policies 180 is associated with one or more conditions and any number and type of conditional instructions. The conditions and conditional instructions may be specified in any manner as known in the art. For example, each of the policies 180 may include any combination of algorithms, heuristics, rules, and the like.

If the policy enforcing server 190 determines that the condition(s) specified in the policy 180 are met, then the policy enforcing server 190 executes the appropriate conditional instruction(s) specified in the policy 180. For explanatory purposes, if the condition(s) specified in the policy 180 are met, then the policy 180 is referred to herein as an "applicable" policy 180. Further, "applying" a given policy 180 refers to the process of determining that the policy 180 is applicable and then executing the conditional instruction(s). The conditional instruction(s) may configure any element (including the policy enforcing server 190) to perform any number and type of network management operations in any technically feasible fashion.

In general, the policy enforcing server 190 may be configured to evaluate and apply the policies 180 in any technically feasible fashion based on any type of input data. The policies 180 may be specified in any technically feasible fashion and in any format. For example, in some embodiments, the policy enforcing server 190 includes a graphical user interface that enables network administrators to specify parameters that define the policies 180. In various embodiments, the policies 180 may be included in the policy enforcing server 190. In other embodiments, the policies 180 may be received by the policy enforcing server 190 in any technically feasible fashion and from any entity. In alternate embodiments, the policy enforcing server 190 may enforce one or more of the policies 180 implemented in any number of other components, such as the recursive resolver 140, in any technically feasible fashion.

In some embodiments, the policy enforcing server 190 receives an attempted action 185 from the device 170 and determines whether any of the policies 180 are applicable to the device 170 and/or the attempted action 185. The policy enforcing server 190 then generates a policy-based action 195 based on the attempted action 185 and any applicable policies 180. For example, suppose that the policy 180 specifies that if a device 170 that is associated with a "heavy social networking" user sends data to a social networking site, then a warning message is to be sent to a network administrator. Further, suppose that the device 170 is associated with a heavy social networking user and generates the attempted action 185 that sends data to a social networking site. In such a scenario, the policy enforcing engine 190 would perform the policy-based action 195 of sending a warning message to the network administrator.

In general, each of the policies 180 may specify any type of behavior based on number of criteria. In particular, many policies 180 involve performing actions based on "profiles" that characterize network activities. Such profiles may be included in policies 180 that are designed to improve quality of service, track reaction to business announcements, identify any devices 170 that are infected, and preserve the privacy of the devices 170, to name a few. The policies 180 may specify a wide variety of actions based on the profiles. In one example, the policies 180 could throttle the Internet bandwidth allocated to the devices 170 that fit a "heavy Internet use" profile. In another example, the policies 180 could sandbox the devices 170 that fit a "possibly infected" profile. In yet another example, the policies 180 could effectuate changes in the handling of any number and type of components included in the system 100, such as the recursive resolver 140, the DHCP server 130, etc.

One limitation of conventional systems that perform network management based on profiles of network activities is that such systems typically rely on conventional data collection techniques that provide belated and/or limited insight into a network. For example, many conventional data collection techniques involve gathering and analyzing data at the application layer. As persons skilled in the art will recognize, the application layer is relatively far down any transaction chain that results in the transfer of data to and from the network. Consequently, remediation strategies implemented based on such data may be ineffective. For instance, confidential information may be transferred to a competitor before the data collected at the application layer via conventional data collection techniques reflects any nefarious activity. In another example, malware may configure the devices in a conventional network to implement a low and slow DDoS attack. Because the application layer activities during a low and slow attack usually appear to be legitimate and are distributed over the devices 170 and time, such malware may elude the detection of conventional data collection techniques.

Profiling Networks Via DNS Transactions

To enable the policy enforcing server 190 to proactively and sagaciously manage the network, the system 100 includes a profiling engine 120. The profiling engine 120 comprises a software program that generally resides within a memory 116 that is included in the profiling server 110 and is executed by a processor 112 that is also included in the profiling server 110. The processor 112 may be any instruction execution system, apparatus, or device capable of executing instructions. For example, the processor 112 could comprise a central processing unit (CPU), a digital signal processor (DSP), a controller, a microcontroller, a state machine, or any combination thereof.

The memory 116 stores content, such as software applications and data, for use by the processor 112. The memory 116 may be any type of non-volatile memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing In alternate embodiments, the profiling server 110 may include any number (including zero) and types of processors 112 and any number (including zero) and types of memories 116 in any combination. The processor 112 and the memory 116 may be implemented in any technically feasible fashion. For example, and without limitation, in various embodiments, the processor 112 and/or the memory 116 may be implemented as a stand-alone chip or as part of a more comprehensive solution that is implemented as an application-specific integrated circuit (ASIC) or a system-on-a-chip (SoC).

In some embodiments, the profiling server 110 may interact with one or more clouds (e.g., encapsulated shared resources, software, data, etc.) to perform operations implemented in the profiling engine 120. In such embodiments, the processor 112 and/or the memory 116 may be implemented in the cloud instead of in the profiling server 110. In yet other embodiments, the functionality of the profiling engine 120 may be implemented in the policy enforcing server 190 or any other entity included in the system 100.

In operation, the profiling engine 120 analyzes domain name system (DNS) traffic to gain insight into the operation of the network. As referred to herein, "DNS traffic" comprises any number and type of transactions involving the DNS. The DNS is the part of the Internet infrastructure that translates human-readable domain names into Internet Protocol (IP) addresses 172 needed to establish TCP/IP (Transmission Control Protocol/Internet Protocol) communication over the Internet. The DNS is the mechanism that allows users to refer to web sites and other resources via intuitive domain names, such as "example.com," rather than the actual numeric IP addresses 172, e.g., 192.0.2.78, that are associated with different websites and other resources. As referred to herein, a "resource" may be any type of device or service that is accessible via one of the IP addresses 172.

Each domain name is typically made up of a series of character strings or "labels," where every two such character strings within the domain name are separated by a dot. The right-to-left order of the labels within a domain name correspond to the top-to-bottom order of domain names in a DNS hierarchy. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "example.com". Domains can nest within the hierarchy for many levels.

In general, the DNS enables users to associate a variety of information with domain names based on resource records. For example, in addition to storing address records that map domain names to the IP addresses 172, the DNS stores service records (SRV) that identify services. Further, the DNS stores text records (TXT) that include arbitrary text and enable the DNS to serve as a general purpose database. A hierarchy of DNS servers included in the system 100 maintain the resource records in large databases. In a process referred to herein as "DNS resolution," DNS servers traverse the DNS hierarchy to translate domain names into the corresponding IP addresses 172 associated with different resources.

In particular, the recursive resolver 140 is a DNS server that receives DNS queries 175 from the devices 170. Each DNS query 175 requests information stored in the DNS based on a domain name. Upon receiving the DNS query 175, the recursive resolver 140 typically attempts to respond to the DNS query 175 based on information stored in a cache associated with the recursive resolver 140. If the cache associated with the recursive resolver 140 does not include the information requested in the DNS query 175, then the recursive resolver 140 may generate one or more additional DNS queries 175 that traverse the DNS hierarchy in an attempt to obtain the requested information. In alternate embodiments, the system 100 may include any number and types of other DNS servers in addition to the recursive resolver 140. For example, in various embodiments, the system 100 may include any number of authoritative name servers and/or forwarding resolvers.

As persons skilled in the art will recognize, a DNS transaction is typically the first transaction included in a chain of transactions that culminates in a transfer of data to or from the network. As referred to herein, a "DNS transaction" is any event in which a DNS server receives or transmits DNS information, such as the DNS queries 175 and DNS responses. Consequently, DNS transactions are indicative of future transactions that result in the transfer of data to or from the network. Furthermore, aggregations of DNS transactions may reveal commonalities between transaction chains that elude conventional data collection techniques.

For example, suppose that the network is infected with malware that configures the devices 170 to execute transaction chains that culminate in different malicious operations involving a single target. Prior to executing any malicious operations, each of the devices 170 typically generates a separate DNS query 175 based on the domain name of the target. Because the DNS queries 175 share a common domain name, the DNS transactions reveal commonalities between the transaction chains. By contrast, because the commonalities between the transaction chains are obscured by later transactions in the transaction chains, application layer data may not reveal the commonalities between the transaction chains.

To enable the profiling engine 120 to analyze DNS transactions, the recursive resolver 140 is configured to enable DNS logging. The recursive resolver 140 may be configured to enable DNS logging in any technically feasible fashion that is consistent with the DNS protocol. For example, in some embodiments, a network administrator may configure the recursive resolver 140 to implement "analytical event logging." As part of analytical event logging, whenever the recursive resolver 140 receives the DNS query 175 or transmits a DNS response, the recursive resolver 140 generates a DNS log 145.

Each of the DNS logs 145 may include any amount of data in any format that is consistent with the implemented logging protocol. For example, in some embodiments the DNS log 145 associated with a given DNS query 175 includes a source IP address (not shown in FIG. 1), a timestamp (not shown in FIG. 1), the DNS query 175, and the DNS response to the DNS query 175. As referred to herein, the "source IP address" of a given DNS query 175 is the IP address 172 of the resource (e.g., the device 170) that transmits the DNS query 175 to a DNS server. The timestamp specifies the time and/or date that the DNS server receives the DNS query 175.

As shown, the recursive resolver 140 transmits the DNS logs 145 to the data repository 150. The data repository 150 is a database that is capable of storing the DNS logs 145 and may be implemented in any technically feasible fashion. After receiving the DNS logs 145, the data repository 150 transmits DNS transaction data 155 based on the DNS logs 145 to the profiling engine 120. In some embodiments, the data repository 150 does not perform any data processing operations on the DNS logs 145. In such embodiments, the data repository 150 forwards the DNS logs 145 to the profiling engine 120 as the DNS transaction data 155. In other embodiments, the data repository 150 performs any number of correlation and/or analysis operations on the DNS logs 145 to generate the DNS transaction data 155. In yet other embodiments, the data repository 150 may be integrated with the recursive resolver 140, the profiling server 110, the profiling engine 120, or any other software or hardware entity included in the system 100.

The profiling engine 120 analyzes the DNS transaction data 155, generates profiling results 160, and transmits the profiling results 160 to the policy enforcing server 190. The profiling engine 120 may perform any number and type of analysis operations on the DNS transaction data 155 to generate the profiling results 160. For example, in some embodiments, the profiling engine 120 generates sets of DNS queries 175 and then analyzes each set of DNS queries 175 to determine which sets fit one or more predetermined profiles. To generate such sets, the profiling engine 120 may partition the DNS queries 175 based on the source IP addresses and/or aggregate the DNS queries 175 over predetermined time periods. To determine whether a given set fits a predetermined profile, the profiling engine 120 may perform any number of operations including comparison, correlation, mathematic operations, and the like. Finally, the profiling engine 120 generates the profiling results 160 that indicate which of the sets fit each of the predetermined profiles.

The behavior of the profiling engine 120 may be configured prior to execution, during execution, or any combination thereof, using any techniques as known in the art. For example, in some embodiments, the profiling engine 120 may be configured prior to execution via software, hardware, and/or configuration settings, to name a few. In other embodiments, the profiling engine 120 may be dynamically configured via a profiling configuration 125, any number (including zero) of additional data feeds 122, and any number (including zero) of identifying data 135.

The profiling configuration 125 configures the profiling engine 120 to perform any number and types of analysis on the DNS transaction data 155 to generate the profiling results 160. The additional data feeds 122 may include any source of data or telemetry that the profiling engine 120 is configured to analyze in conjunction with the DNS transaction data 155. For example, the additional data feeds 122 may include threat feeds, content categorization feeds, and so forth. The profiling configuration 125 and the additional data feeds 122 may be generated and transmitted to the profiling engine 120 by any entity and in any technically feasible fashion.

The identifying data 135 map the source IP addresses specified in the DNS transaction data 155 to any number of identifying characteristics. Such identifying characteristics may include any combination of media access control (MAC) addresses, user names, group identifiers, and certificates, to name a few. As shown, the profiling engine 120 receives the identifying data 135 from the DHCP server 130. In alternate embodiments, the profiling engine 120 may receive the identifying data 135 from any entity in any technically feasible fashion. For example, in some embodiments, a network administrator may provide the identifying data 135 to the profiling engine 120 via a user interface.

The DHCP is a standardized network protocol in which the DHCP server 130 dynamically distributes network configuration parameters. Upon connecting to the network, the device 170 receives the network configuration parameters for the device 170 from the DHCP server 130. The network configuration parameters include, without limitation, the IP address 172 assigned to the device 170 and an IP address 172 that identifies the recursive resolver 140. In various embodiments, the DHCP server 130 is configured to map the IP address 172 to the identifying characteristics and then transmit the resulting identifying data 135 to the profiling engine 120. In some embodiments, the DHCP server 130 is configured to transmit the identifying data 135 to the data repository 150 instead of or in addition to the profiling engine 120. In such embodiments, the data repository 150 may perform any amount and type of operations on the DNS logs 145 based on the identifying data 135 to generate the DNS transaction data 155.

The profiling results 160 may include any type of information that provides insight into the network activities of the devices 170 at any level of granularity. For example, if the identifying data 135 maps IP addresses 172 to organizations, then the profiling engine 120 may provide profiling results 160 that specify the organizations that fit a "heavy social networking" profile. In other embodiments, if the identifying data 135 maps IP addresses 172 to users, then the profiling engine 120 may generate a profile for each user within a network that exceeds an Internet data usage threshold. Because the profiling results 160 are based on the DNS transaction data 155, the profiling results 160 enable the policy enforcing server 190 to proactively and effectively tune the performance of the network.

In alternate embodiments, the profiling engine 120 may perform one or more operations involving the profiling result 160 that relate to managing network activity that may or may not include transmitting the profiling results 160 to the policy enforcing server 190. For example, in some embodiments, the profiling engine 120 may display the profiling results 160 to a network administrator or transmit the profiling results 160 to another entity in the system 100. In other embodiments, the profiling engine 120 may perform one or more network management operations based on the profiling results 160. For example, the profiling engine 120 could perform operations that sandbox any of the devices 170 that fit a "potentially infected" profile. In yet other embodiments, the profiling engine 120 may perform any number of operations involving the profiling results 160 that relate to any number and type of activities in any technically feasible fashion. For example, in some embodiments, the profiling engine 120 may perform one or more operations involving at least one of managing activities, persistent storage, and data analysis.

Figure 2:
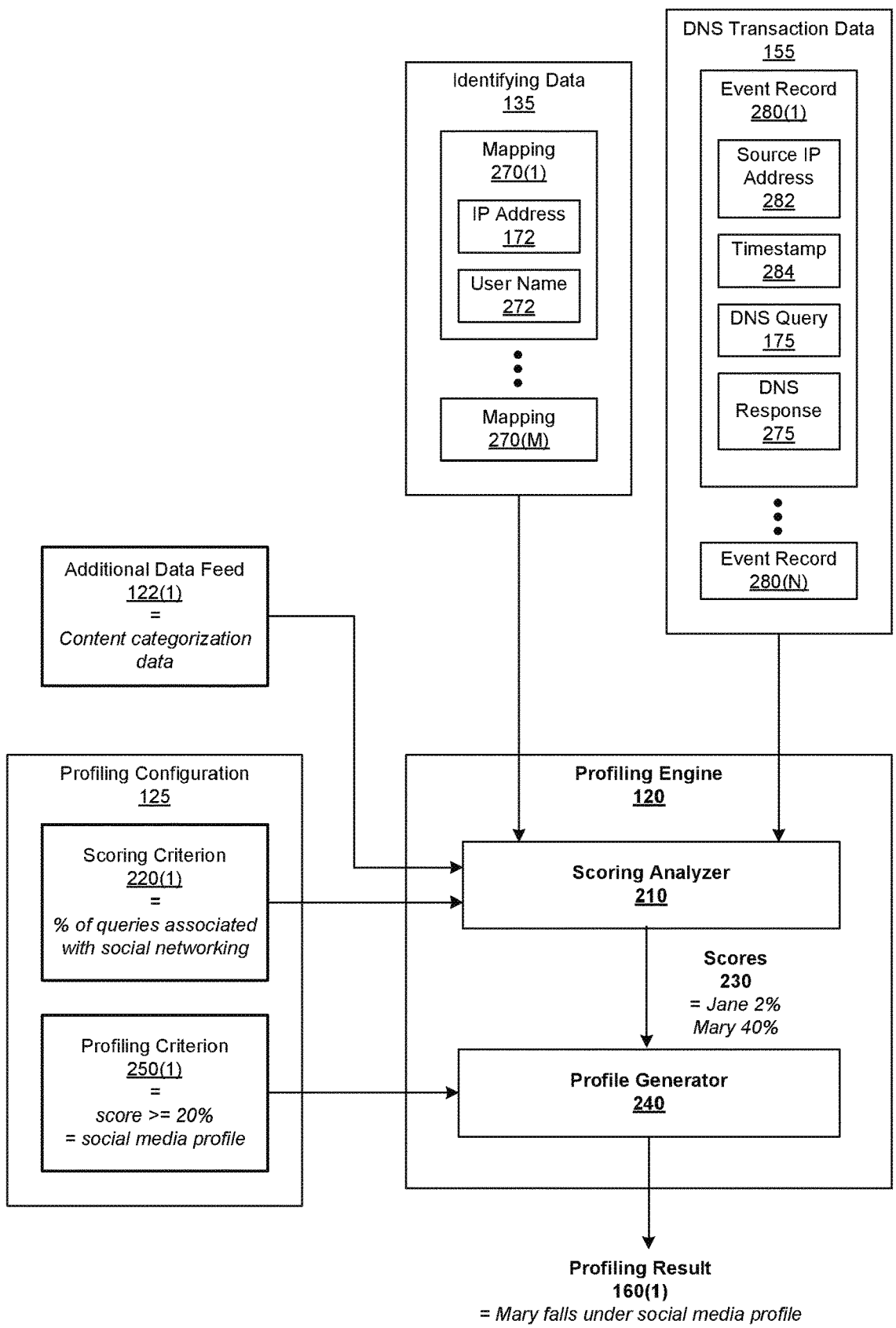
FIG. 2 is a more detailed illustration of the profiling engine of FIG. 1, according to various embodiments of the present invention.

FIG. 2 is a more detailed illustration of the profiling engine 120 of FIG. 1, according to various embodiments of the present invention. For explanatory purposes only, the profiling configuration 125 configures the profiling engine 120 to identify the users within a network that fall under a "social media" profile based, at least in part, on the DNS transaction data 155. In alternate embodiments, the profiling engine 120 may be configured in any technically feasible fashion to provide insight into the operation of any network based on any type of DNS data that is received directly or indirectly (e.g., via a database) from any DNS server.

As shown, the profiling engine 120 includes, without limitation, the scoring analyzer 210 and the profile generator 240. In a complementary fashion, the profiling configuration 125 includes, without limitation, a scoring criterion 220(1) and a profiling criterion 250(1). The scoring criterion 220(1) configures the scoring analyzer 210 to generate scores 230 based on the identifying data 135, the DNS transaction data 155, and the additional data feed 122(1). The profiling criterion 250(1) configures the profile generator 240 to generate the profiling result 160(1) based on the scores 230. In alternate embodiments, the profiling configuration 125 may include any number and type of scoring criteria 220 and any number and type of profiling criteria 250. Further, the number of scoring criteria 220 may or may not equal the number of profiling criteria 250.

The identifying data 135 includes, without limitation, any number of mappings 270. Each of the mappings 270 includes, without limitation, the IP address 172 associated with a given device 170 and a user name 272 that is mapped to the IP address 172. In this fashion, the identifying data 135 associates the devices 170 indirectly with the user names 272. In alternate embodiments, the identifying data 135 may include any number and type of identifying characteristics that are based on the IP addresses 172. Such identifying characteristics may include media access control (MAC) addresses, user names, group identifiers, and certificates, to name a few. Further, the identifying characteristics may be implemented at any level of granularity with respect to the IP addresses 172. For example, the identifying characteristics could include a group identifier, and the identifying data 135 could map all the IP addresses 172 allocated to a given organization to a single group identifier.

The DNS transaction data 155 includes, without limitation, any number of event records 280. As shown for the event record 280(1), each of the event records 280 includes, without limitation, a source IP address 282, a timestamp 284, the DNS query 175, and a DNS response 275. For each event record 280, the source IP address 282 and the timestamp 284 are, respectively, the source IP address 172 of the DNS query 175 and the time associated with the DNS query 175. In alternate embodiments, the event records 280 may include any type of data that is consistent with the DNS logging functionality implemented in the recursive resolver 140 and/or the processing functionality implemented in the data repository 150. For example, in some embodiments, the event records 280 do not include the DNS responses 275. In other embodiments, the data repository 150 receives the identifying data 135 that maps the IP address 172 to the user names 272. In such embodiments, the data repository 150 may generate the event records 280 that include the source user names instead of the source IP addresses 282.

The additional data feed 122(1) includes content categorization data, such as the domain names of social networking websites. In alternate embodiments, the scoring analyzer 210 may receive any number (including zero) of additional data feeds 122 from any entity. For example, in some embodiments, the scoring analyzer 210 the may receive threat feeds that specify the domain names or the IP addresses 172 of potentially malicious websites.

As shown, the scoring criterion 220(1) configures the scoring analyzer 210 to compute the percentage of the DNS queries 175 that specify domain names of social networking websites. The scoring analyzer 210 may compute the percentages in any technically feasible fashion and at any granularity. For example, in some embodiments, the scoring analyzer 210 performs mapping and comparison operations on the DNS queries 175 to partition the DNS queries 175 based on the user names 272. For each partition, the scoring analyzer 210 then aggregates the DNS queries 175 included in the partition over a predetermined time period (e.g., sixty minutes) to generate a per-user set of DNS queries 175. Finally, for each set, the scoring analyzer 210 computes the percentage of the DNS queries 175 included in the set that specify domain names of social networking sites.

In the scenario depicted, the scoring analyzer 210 computes the scores 230 as two percent for the user "Jane" and forty percent for the user "Mary." Subsequently, the profile generator 240 generates the profiling results 160(1) based on the scores 230 and the social media profile defined in the profiling criterion 250(1). As shown, the profiling criterion 250(1) specifies that if the score 230 associated with a given user is greater than twenty percent, then the user fits the social media profile. Consequently, the profile generator 240 generates the profiling result 160(1) that specifies that Mary fits the social medial profile. The profile generator 240 may generate the profiling results 160 in any technically feasible fashion and in any manner that is consistent with the policy enforcing server 190. Further, the profile generator 240 may transmit the profiling results 160 to the policy enforcing server 190 using any communication protocol as known in the art. In alternate embodiments, the profile generator 240 may be configured to provide any type of profiling results 160 to any entity in any technically feasible fashion.

The descriptions of the various embodiments have been presented for purposes of illustration, but are not intended to be exhaustive or limited to the embodiments disclosed. Further, the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques described herein are applicable to providing insight into networks based on DNS traffic.

For example, in alternate embodiments, the inputs to and outputs from the scoring analyzer 210 and the profile generator 240 may vary. In some embodiments, the additional data feed 122 is an input to the profile generator 240 instead of the scoring analyzer 210. In other embodiments, the profile generator 240 may perform any number of operations based on the scores 230 and the profiling criterion 250 to generate any number and type of the profiling results 160. For instance, in some embodiments, the profile generator 240 may generate one or more applicable policies instead of identifying the users within a network that fit a predetermined policy.

In general, the functionality provided by the profiling engine 120 may be implemented in any technically feasible fashion and in any number of modules. In a complementary fashion, the profiling configuration 125 may configure the profiling engine 120 in any technically feasible fashion. For example, in some embodiments, the functionality of the scoring analyzer 210 and the profile generator 240 may be combined into a single module. In another example, the profiling configuration 125 may specify a set of rules for generating profiles that the profiling engine 230 follows to produce profiles for the profiling results 160.

Figure 3:
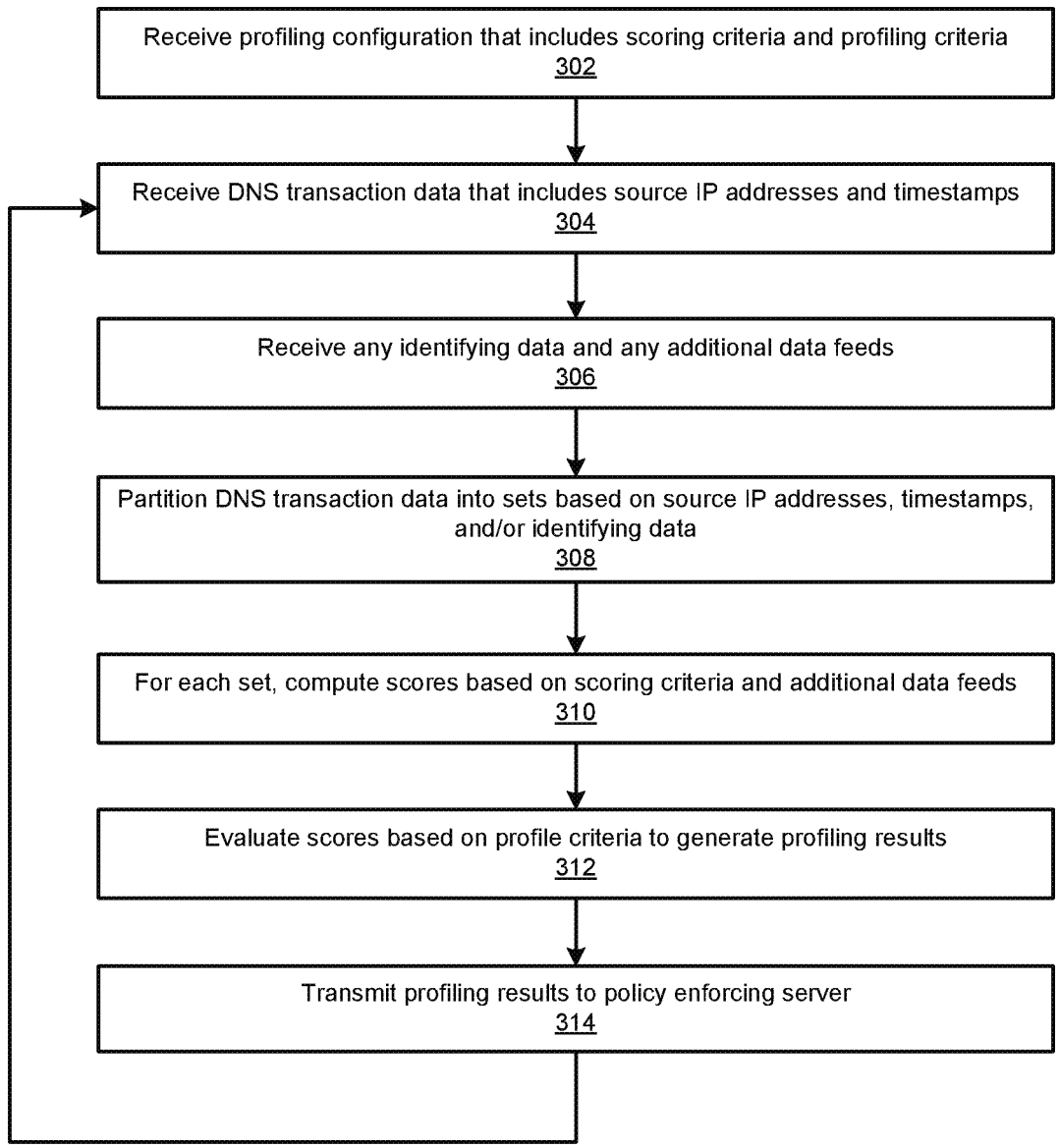
FIG. 3 is a flow diagram of method steps for profiling DNS traffic, according to various embodiments of the present invention.

FIG. 3 is a flow diagram of method steps for profiling DNS traffic, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 302, where the profiling engine 120 receives the profiling configuration 125 that includes the scoring criteria 220 and the profiling criteria 250. The profiling engine 120 may receive the profiling configuration 125 in any technically feasible fashion. For example, the profiling engine 120 could receive the profiling configuration 125 via a user interface. At step 304, the profiling engine 120 receives the DNS transaction data 155 from the data repository 150. The DNS transaction data 155 includes any number of event records 280 that specify DNS transactions (e.g., the DNS queries 175 and/or the DNS responses 275), the source IP addresses 282, and the timestamps 284. In alternate embodiments, the profiling engine 120 may receive any type of data based on the DNS logging activities of any DNS server in any technically feasible fashion.

At step 306, the profiling engine 120 receives any identifying data 135 and/or any additional data feeds 122. The identifying data 135 includes the mappings 270 that associate the IP addresses 172 allocated to the devices 170 to any number of identifying characteristics at any level of granularity. For example, the identifying data 135 may specify a one-to-one mapping 270 between a given IP address 172 and a user in addition to a many-to-one mapping 270 between multiple IP addresses 172 and an organization. The profiling engine 120 may receive the identifying data 135 in any technically feasible fashion. For example, the profiling engine 120 could receive the identifying data 135 from the DHCP server 130. The additional data feeds 122 provide any amount and type of data and/or telemetry that is relevant to implementing the profiling configuration 125. The additional data feeds 122 may be received from any entity in any technically feasible fashion.

At step 308, the scoring analyzer 210 partitions the DNS transaction data 155 into sets based on the source IP addresses 282, the timestamps 284, and/or the identifying data 135. As part of step 308, the scoring analyzer 210 may perform any number and type of data analysis operations. In various embodiments, the scoring analyzer 210 may perform any combination of aggregation, comparison, correlation, and selection operations, to name a few. For example, the scoring analyzer 210 could perform comparison and aggregation operations on the DNS transaction data 155 to generate sets that are associated with a particular user during a ten minute time period.

At step 310, for each set, the scoring analyzer 210 computes one or more scores 230 based on the scoring criteria 220 and the additional data feeds 122. As part of step 310, the scoring analyzer 210 may execute any number and type of algorithms, heuristics, operations, and so forth. For example, the scoring analyzer 210 could compute a per-set percentage of the DNS queries 175 that specify domain names classified by the additional data feed 122(1) as social networking websites. In alternate embodiments, the scoring analyzer 210 may compute any type of information instead of the scores 230 at any level of granularity. For example, the scoring analyzer 210 could analyze the DNS transaction data 155 to generate a Boolean value of one for any of the DNS queries 175 that specify domain names that the additional data feed 122(2) classifies as potentially malicious.

At step 312, the profile generator 240 evaluates the scores 230 based on the profiling criteria 250 to generate the profiling results 160. As part of step 312, the scoring analyzer 210 may execute any number and type of algorithms, heuristics, operations, and so forth. Further, the scoring analyzer 210 may generate any number of new profiles or correlate the scores 230 with any number of existing profiles at any granularity to produce the profiling results 160.

For example, in some embodiments, the profile generator 240 may perform comparison operations on a subset of the scores 230 that specify percentages of social networking website traffic against an acceptable threshold specified in the profiling criteria 250(1). Each of the scores 230 included in the subset of scores 230 may be associated with any level of granularity, such as per-user, per-organization, etc., that is consistent with the scoring criteria 220. In another example, the scoring analyzer 210 may perform comparison operations on Boolean values that specify whether each of the DNS queries 175 is associated with a potentially malicious domain name.

At step 314, the profiling engine 120 transmits the profiling results 160 to the policy enforcing server 190, and the method 300 returns to step 304, where the profiling engine 120 receives new DNS transaction data 155. The profiling engine 120 continues to cycle through steps 304-314, processing and analyzing DNS traffic until the profiling engine 120 stops operating. As persons skilled in the art will recognize, the profiling engine 120 may process and respond to DNS transaction data 155 concurrently. Consequently, the profiling engine 120 may be executing different method steps on different DNS transaction data 155 substantially in parallel. Further, in some embodiments, the profiling engine 120 may receive an updated profiling configuration 125 as the profiling engine 120 operates.

In sum, the disclosed techniques enable profiling of DNS traffic. A recursive resolver is configured to transmit DNS logs that include DNS transactions to a data repository. Each DNS transaction is associated with a source IP address and a timestamp. The data repository stores and optionally pre-processes the DNS logs to generate DNS transaction data. A profiling engine receives the DNS transaction data from the data repository, identifying data from a DHCP server, and any number of additional data feeds. The identifying data maps the source IP addresses specified in the DNS transaction data to one or more identifying characteristics. Such identifying characteristics may include any data that is consistent with the IP address allocation process implemented in the DHCP server. For example, the identifying characteristics may include media access control (MAC) addresses, user names, group identifiers, and certificates, to name a few. The additional data feeds may include any sources of data or telemetry, such as threat feeds, content categorization feeds, and so forth.

The profiling engine includes a scoring analyzer and a profile generator. The scoring analyzer generate sets of the DNS transaction data based on the source IP addresses, identifying data, and/or timestamps. For each set, the scoring analyzer then evaluates the associated DNS transaction data based on scoring criteria and the additional data feeds to generate scores. The profile generator receives the scores and applies profiling criteria to generate profiling results that specify any number of profiles. The scoring analyzer and the profile generator may be configured to partition the DNS transaction data, generate the scores, and generate the profiling results at any technically feasible level of granularity.

For example, the identifying data could associate each source IP address with a different user. For each user, the scoring analyzer could select the DNS transaction data associated with the user based on the source IP addresses included in the DNS transaction data to generate a per-user set. Subsequently, for each user, the scoring analyzer could generate a score based on the domain names specified in the DNS queries included in the set that is associated with the user. In a complementary fashion, the profile generator could analyze the per-user scores to generate profiling results that indicate which user(s) fit one or more predetermined profiles.

Advantageously, the techniques described herein facilitate proactive and comprehensive monitoring of the network activities of devices. Notably, each transaction chain that results in the transfer of data to and from the network is typically initiated with a DNS query for resolution of a domain name. Consequently, the profiling engine may be configured to generate profiling results that are indicative of follow-on transactions based on such DNS queries. Subsequently, a policy enforcing application may execute a remediation plan based on the profiling results. The remediation plan may modify the activities of devices on the network prior to the execution of undesirable transactions, such as attacks on a victim by infected devices. Further, because the profiling engine may be configured to implement heuristics that correlate multiple DNS queries over relatively long time periods, the profiling engine may identify traffic patterns that elude conventional data collection engines. For example, the profiling engine may identify low and slow DDoS attacks based on the initial DNS queries that characterize such attacks.

1. In some embodiments, a method for profiling domain name service (DNS) traffic, the method comprises receiving DNS transaction data that is associated with DNS logging operations performed by a DNS server; determining a score based on the DNS transaction data and at least one scoring criteria; evaluating the score based on at least one profiling criteria to generate a profiling result; and performing one or more operations involving the profiling result that relate to at least one of managing activities, persistent storage, and data analysis.

2. The method of clause 1, wherein determining the score comprises selecting one or more DNS transactions included in the DNS transaction data based on at least one of an Internet Protocol (IP) address and a time period; and analyzing the one or more DNS transactions based on the at least one scoring criteria to determine the score.

3. The method of clauses 1 or 2, wherein determining the score comprises receiving identifying data that maps one or more Internet Protocol (IP) addresses to an identifying characteristic; performing one or more comparison operations between one or more DNS transactions included in the DNS transaction data and the identifying data to select one or more DNS transactions; and analyzing the one or more DNS transactions based on the at least one scoring criteria to determine the score.

4. The method of any of clauses 1-3, wherein the identifying characteristic comprises a user name, a media access control (MAC) address, a group identifier, or a certificate.

5. The method of any of clauses 1-4, wherein determining the score comprises performing one or more comparison operations between the DNS transaction data and at least one additional data feed based on the at least one scoring criteria.

6. The method of any of clauses 1-5, wherein the DNS transaction data comprises at least one of a DNS query and a DNS response.

7. The method of any of clauses 1-6, wherein evaluating the score comprises performing one or more comparison operations between the score and a predetermined threshold specified in a first profiling criterion included in the at least one profiling criteria to determine whether the score fits a predetermined profile specified in the first profiling criterion.

8. The method of any of clauses 1-7, wherein evaluating the score comprises applying the at least one profiling criteria to the score to generate a profile of network activities.

9. In some embodiments, a computer-readable storage medium includes instructions that, when executed by a processor, cause the processor to profile domain name service (DNS) traffic by performing the steps of receiving DNS transaction data that is associated with DNS logging operations performed by a DNS server; determining a score based on the DNS transaction data and at least one scoring criteria; evaluating the score based on at least one profiling criteria to generate a profiling result; and performing one or more operations involving the profiling result that relate to at least one of managing activities, persistent storage, and data analysis.

10. The computer-readable storage medium of clause 9, wherein determining the score comprises selecting one or more DNS transactions included in the DNS transaction data based on at least one of an Internet Protocol (IP) address and a time period; and analyzing the one or more DNS transactions based on the at least one scoring criteria to determine the score.

11. The computer-readable storage medium of clauses 9 or 10, wherein determining the score comprises receiving identifying data that maps one or more Internet Protocol (IP) addresses to an identifying characteristic; performing one or more comparison operations between one or more DNS transactions included in the DNS transaction data and the identifying data to select one or more DNS transactions; and analyzing the one or more DNS transactions based on the at least one scoring criteria to determine the score.

12. The computer-readable storage medium of any of clauses 9-11, wherein the identifying characteristic comprises a user name, a media access control (MAC) address, a group identifier, or a certificate.

13. The computer-readable storage medium of any of clauses 9-12, wherein determining the score comprises performing one or more comparison operations between the DNS transaction data and at least one additional data feed based on the at least one scoring criteria.

14. The computer-readable storage medium of any of clauses 9-13, wherein the at least one additional data feed comprises at least one of a threat feed and a content categorization feed.

15. The computer-readable storage medium of any of clauses 9-14, wherein determining the score comprises performing a comparison operation between a domain name specified in a DNS query included in the DNS transaction data and a domain name specified in a first scoring criterion included in the at least one scoring criteria.

16. The computer-readable storage medium of any of clauses 9-15, wherein performing one or more operations involving the profiling result comprises transmitting the profiling result to a network management tool.

17. In some embodiments, a system comprises a memory storing a policy engine; and a processor that is coupled to the memory and, when executing the profiling engine, is configured to receive a DNS query that is associated with a source Internet Protocol (IP) address; receive DNS transaction data that is associated with DNS logging operations performed by a DNS server; determine a score based on the DNS transaction data and at least one scoring criteria; evaluate the score based on at least one profiling criteria to generate a profiling result; and perform one or more operations involving the profiling result that relate to at least one of at least one of managing activities, persistent storage, and data analysis.

18. The system of clause 17, wherein the profiling engine configures the processor to determine the score by receiving identifying data that maps one or more Internet Protocol (IP) addresses to at least one of a user name, a media access control (MAC) address, a group identifier, or a certificate; performing one or more comparison operations between one or more DNS transactions included in the DNS transaction data and the identifying data to select one or more DNS transactions; and analyzing the one or more DNS transactions based on the at least one scoring criteria to determine the score.

19. The system of clauses 17 or 18, wherein the profiling engine configures the processor to determine the score by performing one or more comparison operations between the DNS transaction data and at least one additional data feed based on the at least one scoring criteria.

20. The system of any of clauses 17-19, wherein the DNS transaction data comprises at least one of a DNS query and a DNS response.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for profiling domain name system (DNS) traffic, the method comprising:
    receiving DNS transaction data that is associated with DNS logging operations performed by a DNS server;
    receiving identification data that associates a first set of identification data to a second set of identification data, wherein the first set of identification data comprises Internet Protocol (IP) addresses, wherein the second set of identification data comprises one or more user identifiers;
    partitioning, based on the second set of identification data, the DNS transaction data into a plurality of data partitions, wherein a given data partition included in the plurality of data partitions corresponds to a distinct user identifier of the second set of identification data; and
    for a first data partition of the plurality of data partitions:
        receiving content categorization data from at least one data feed, wherein the content categorization data identifies a social media data;
        determining a first score based on (i) one or more domain names specified in the first data partition, (ii) the content categorization data, and (iii) at least one scoring criteria, wherein the first data partition corresponds to a first user identifier of the one or more user identifiers;

evaluating the first score based on profiling criteria to determine a first profiling result for the first user identifier; and causing one or more operations involving the first profiling result to be performed, wherein the one or more operations relate to at least one of: managing an activity, persistent storage or data analysis.

2. The computer-implemented method of claim 1, wherein partitioning the DNS transaction data comprises:

selecting one or more DNS transactions included in the DNS transaction data that share the first user identifier as a first identifying characteristic in a set of identifying characteristics; and generating the first data partition based on the one or more DNS transactions.

3. The computer-implemented method of claim 1, wherein partitioning the DNS transaction data comprises:

performing, based on the first user identifier, one or more comparison operations between one or more DNS transactions included in the DNS transaction data and the identification data to select one or more DNS transactions; and generating the first data partition based on the one or more selected DNS transactions.

4. The computer-implemented method of claim 3, wherein:

the one or more user identifiers are included in a set of identifying characteristics, and the set of identifying characteristics further comprises at least one of a media access control (MAC) address or a certificate.

5. The computer-implemented method of claim 4, wherein each data partition further corresponds to a different identifying characteristic included in the set of identifying characteristics.

6. The computer-implemented method of claim 1, wherein the DNS transaction data comprises at least one of a DNS query or a DNS response.

7. The computer-implemented method of claim 1, wherein evaluating the first score comprises performing one or more comparison operations between the first score and a predetermined threshold, specified in a first profiling criterion that is included in the profiling criteria, to determine whether the first score fits a predetermined profile specified in the first profiling criterion.

8. The computer-implemented method of claim 1, wherein evaluating the first score comprises applying the profiling criteria to the first score to generate a profile of network activities.

9. The computer-implemented method of claim 1, wherein determining the first score comprises generating the first score based on a set of DNS queries associated with the first data partition that were initiated to resolve a first domain name.

10. The computer-implemented method of claim 1, further comprising: receiving a threat feed from at least one data feed, wherein the threat feed identifies a potentially malicious web site, wherein determining the first score is further based on the threat feed.

11. The computer-implemented method of claim 1, wherein the IP addresses of the first set of identification data comprise source IP addresses, wherein the first user identifier is associated with a plurality of source IP addresses.

12. The computer-implemented method of claim 1, wherein the social media data comprises a domain name associated with a social networking website.

13. The computer-implemented method of claim 1, wherein determining the first score comprises: computing a percentage of the one or more domain names specified in the first data partition that relate to the content categorization data, wherein the profiling criteria comprises at least one predetermined percentage that relates to the content categorization data.

14. One or more non-transitory computer-readable storage media including instructions that, when executed by one or more processors, cause the one or more processors to profile domain name system (DNS) traffic by performing the steps of:

receiving DNS transaction data that is associated with DNS logging operations performed by a DNS server;

receiving identification data that associates a first set of identification data to a second set of identification data, wherein the first set of identification data comprises Internet Protocol (IP) addresses, wherein the second set of identification data comprises one or more user identifiers;

partitioning, based on the second set of identification data, the DNS transaction data into a plurality of data partitions, wherein a given data partition included in the plurality of data partitions corresponding to a distinct user identifier the second set of identification data; and for a first data partition of the plurality of data partitions:

receiving content categorization data from at least one data feed, wherein the content categorization data identifies a social media data;

determining a first score based on (i) one or more domain names specified in the first data partition, (ii) the content categorization data, and (iii) at least one scoring criteria, wherein the first data partition corresponds to a first user identifier of the one or more user identifiers;

evaluating the first score based on profiling criteria to determine a first profiling result for the first user identifier; and causing one or more operations involving the first profiling result to be performed, wherein the one or more operations relate to at least one of: managing an activity, persistent storage, or data analysis.

15. The one or more non-transitory computer-readable storage media of claim 14, wherein partitioning the DNS transaction data comprises:

selecting one or more DNS transactions included in the DNS transaction data that share the first user identifier as a first identifying characteristic in a set of identifying characteristics; and generating the first data partition based on the one or more DNS transactions.

16. The one or more non-transitory computer-readable storage media of claim 14, wherein partitioning the DNS transaction data comprises:

performing, based on the first user identifier, one or more comparison operations between one or more DNS transactions included in the DNS transaction data and the identification data to select one or more DNS transactions; and generating the first data partition based on the one or more selected DNS transactions.

17. The one or more non-transitory computer-readable storage media of claim 16, wherein:
   the one or more user identifiers are included in a set of identifying characteristics, and
   the set of identifying characteristics further comprises at least one of a media access control (MAC) address or a certificate.

18. The one or more non-transitory computer-readable storage media of claim 14, wherein determining the first score comprises performing one or more comparison operations between the first data partition and at least one additional data feed based on the at least one scoring criteria.

19. The one or more non-transitory computer-readable storage media of claim 18, wherein the at least one additional data feed comprises at least one of (i) a threat feed or (ii) a content categorization feed that includes the content categorization data.

20. The one or more non-transitory computer-readable storage media of claim 14, wherein determining the first score comprises performing a comparison operation between:
   (i) a domain name specified in a DNS query included in the first data partition, and
   (ii) a domain name specified in a first scoring criterion that is included in the at least one scoring criteria.

21. The one or more non-transitory computer-readable storage media of claim 14, wherein performing one or more operations involving the first profiling result comprises transmitting the first profiling result to a network management tool.

22. The one or more non-transitory computer-readable storage media of claim 14, wherein evaluating the first score comprises performing one or more comparison operations between the first score and a predetermined threshold, specified in a first profiling criterion that is included in the profiling criteria, to determine whether the first score fits a predetermined profile specified in the first profiling criterion.

23. A system comprising:
   a memory storing a profiling engine; and
   a processor that is coupled to the memory and, when executing the profiling engine, is configured to:
   receive a DNS query that is associated with a source Internet Protocol (IP) address;
   receive DNS transaction data that is associated with DNS logging operations performed by a DNS server;
   receive identification data that associates a first set of identification data to a second set of identification data, wherein the first set of identification data comprises Internet Protocol (IP) addresses, wherein the second set of identification data comprises one or more user identifiers;
   partition, based on the second set of identification data, the DNS transaction data into a plurality of data partitions, wherein a given data partition included in the plurality of data partitions corresponding to a distinct user identifier of the second set of identification data; and
   for a first data partition of the plurality of data partitions:
   receive content categorization data from at least one data feed, wherein the content categorization data identifies a social media data;
   determine a first score based (i) on one or more domain names specified in the first data partition, (ii) the content categorization data, and (iii) at least one scoring criteria, wherein the first data partition corresponds to a first user identifier of the one or more user identifiers;
   evaluate the first score based on profiling criteria to determine a first profiling result for the first user identifier; and
   cause one or more operations involving the first profiling result to be performed, wherein the one or more operations relate to at least one of: managing an activity, persistent storage, or data analysis.

24. The system of claim 23, wherein the processor is configured to partition the DNS transaction data by:
   performing, based on the first user identifier, one or more comparison operations between one or more DNS transactions included in the DNS transaction data and the identification data to select one or more DNS transactions; and
   generating the first data partition based on the one or more selected DNS transactions.

25. The system of claim 23, wherein the processor is configured to determine the first score by performing one or more comparison operations between the first data partition and at least one additional data feed using the at least one scoring criteria.

* * * * *